United States Patent [19]

Yanagiuchi

[11] 4,355,370

[45] Oct. 19, 1982

[54] STORAGE FORMAT IN A WORD MEMORY OF ELECTRONIC DICTIONARY AND LANGUAGE INTERPRETER

[75] Inventor: Shigenobu Yanagiuchi, Tenri, Japan

[73] Assignee: Sharp Kabushiki Kaisha, Osaka, Japan

[21] Appl. No.: 114,744

[22] Filed: Jan. 24, 1980

[30] Foreign Application Priority Data

Jan. 26, 1979 [JP] Japan .................................. 54-8476

[51] Int. Cl.$^3$ ............................................ G06F 15/38
[52] U.S. Cl. .................................................. 364/900
[58] Field of Search ... 364/200 MS File, 900 MS File, 364/419

[56] References Cited

U.S. PATENT DOCUMENTS 3,932,859   1/1976   Kyriakides et al. ............ 364/900 X
4,158,236   6/1979   Levy .................................. 364/900
4,159,536   6/1979   Kehoe et al. ....................... 364/900

Primary Examiner—Raulfe B. Zache

Attorney, Agent, or Firm—Birch, Stewart, Kolasch & Birch

[57] ABSTRACT

A portable electronic dictionary and language interpreter comprises an input device for entering a word wherein the leading character is represented as a capital character and the remaining one or more characters are represented as small characters, and a translator for memorizing the word and a translated word equivalent thereto. The word is contained within the translator in a form wherein the leading character is written as a small character and there is contained therein an indication representing that the small character of the word stored in the translator should be changed to the corresponding capital character. A control device is provided for permitting the translator to generate the word and the equivalent translated word, the word being represented in a form therein the leading character thereof is written as a capital character and the remaining one or more characters are written as small characters.

19 Claims, 5 Drawing Figures

| (A) | (B) | (C) |
|---|---|---|
| ⋮ | ⋮ | |
| $4sion | emulsion | |
| Enable | Enable → enable |
| $1mel | enamel | |
| ⋮ | ⋮ | |
| $3ine | engine | |
| $5er | engineer | |
| $3lanD | englanD → England |
| $4isH | englisH → English |
| $3rave | engrave | |
| ⋮ | ⋮ | |
| $2vy | envy | |

STORAGE FORMAT IN A WORD MEMORY OF ELECTRONIC DICTIONARY AND LANGUAGE INTERPRETER

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from any conventional type of electronic device in that the former is of a unique structure which provides for efficient and rapid retrieval of word information stored in a memory. An example of such an electronic dictionary and language interpreter was disclosed in Levy U.S. Pat. No. 4,158,236, June 12, 1979, "ELECTRONIC DICTIONARY AND LANGUAGE INTERPRETER".

In these portable devices, it is further desirable that storage capacity for a memory storing a plurality of words be minimized.

SUMMARY OF THE INVENTION

Accordingly, it is the primary object of the present invention to provide an improved electronic dictionary and language interpreter for permitting storage capacity for a memory storing a plurality of words to be minimized.

It is a further object of the present invention to provide an improved electronic dictionary and language interpreter comprising a memory means for storing a plurality of words in a form that the leading character is written as a small character, the memory means being applicable such that the retrieved words are represented in the form whereby a leading character is written as a capital character.

It is a further object of the present invention to provide an improved electronic dictionary and language interpreter having a unique storage and retrieval system wherein capital letter indication information is stored therein in conjunction with word information whereby the leading character of a certain word defined by the word information is written in capital letter from with the help of the capital letter indication information.

It is a further object of the present invention to provide an improved electronic dictionary and language interpreter comprising means for enabling retrieval of a word having the leading letter written in a capital character with the introduction of an input word having the letter written in the corresponding small character.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic dictionary and language interpreter comprises an input device for entering a word written in a form that the leading character is represented in a capital character and the remaining one or more characters are represented in a small character, and a translator for memorizing the word and a translated word equivalent thereto. The word is contained within the translator in a form that the leading character is written in a small character and there is contained an indication representing that the small character of the word stored in the translator should be changed to the corresponding capital character.

A control device is provided for permitting the translator to generate the word and the equivalent translated word, the word being represented in the form that the leading character thereof is written in the capital character and the remaining one or more characters are written in the small character.

BRIEF DESCRIPTION OF THE DRAWINGS

The present invention will become more fully understood from the detailed description given hereinbelow and accompanying drawings which are given by way of illustration only, and thus are not limitative of the present invention and wherein:

FIGS. 4a, 4b, 4c show a table explaining storage and retrieval principle available in connection with the present invention.

DESCRIPTION OF THE INVENTION

First of all, any kind of language can be applied to an electronic dictionary and language interpreter of the present invention. An input "source" word or words are spelled in a specific language to obtain an equivalent word or words, or a translated word spelled in a different language corresponding thereto. The kind of the language can be freely selected. According to an example of the present invention, it is assumed that the specific language is English and the different language is Japanese.

Figure 1:
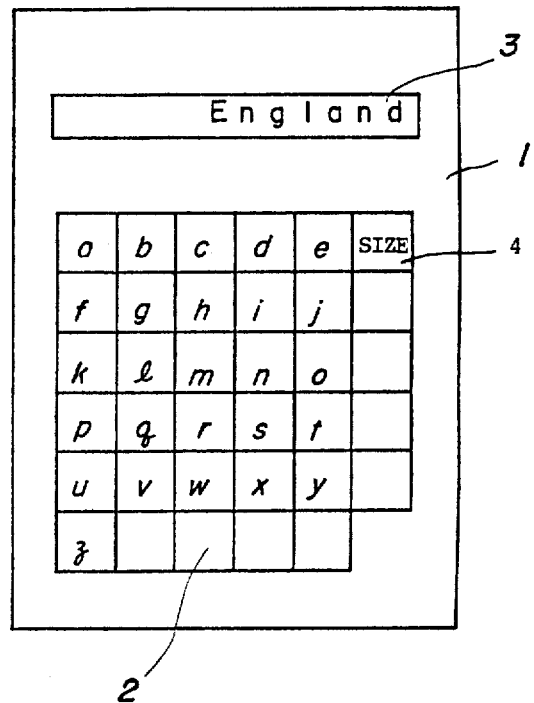
FIG. 1 is a plan view of an electronic dictionary and language interpreter according to the present invention.

Referring to FIG. 1, there is illustrated in a plan view an electronic dictionary and language interpreter of the present invention. The electronic dictionary and language interpreter comprises a main frame 1, an alphabetical keyboard 2, and a display 3. Respective alphabetical key switches contained within the alphabetical keyboard 2 are actuated to enter a desired English "source" word or words. The display 3 indicates the English "source" word or words entered by means of the alphabetical keyboard 2. There is provided a size key 4 contained within the alphabetical keyboard 2. When the size key 4 is not actuated in connection with the actuation of respective alphabetical key switches contained within the alphabetical keyboard 2, the activation of the respective alphabetical key switches enables related code information representing small characters equivalent to the actuated alphabetical key switches to be produced.

Once the size key 4 is actuated prior to the actuation of any of the alphabetical key switches, the activation of the first alphabetical key switch enables relevant code information indicating the capital character equivalent to the first actuated alphabetical key switch to be produced. In connection with the next and the later actuated alphabetical key switches, there is not generated any code information representing capital characters but that representing small characters.

Figure 2:
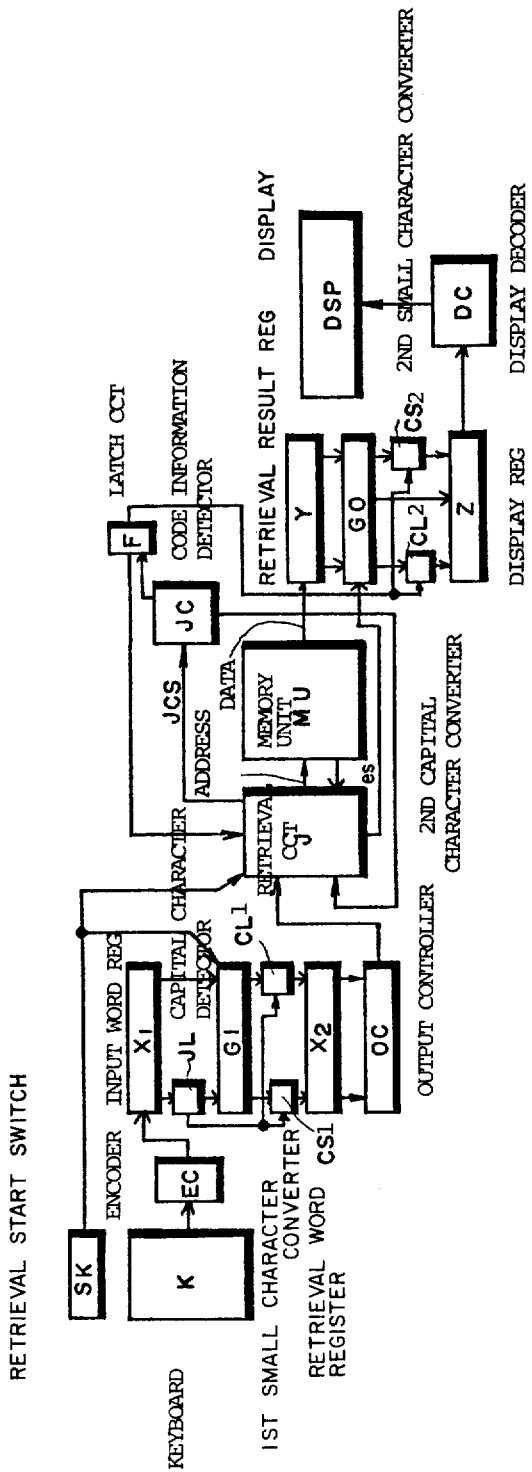
FIG. 2 is a block diagram of a preferred example of a control circuit incorporated within the electronic dictionary and language interpreter shown in FIG. 1.

FIG. 2 shows a block diagram of a preferred embodiment of a control circuit incorporated within the electronic dictionary and language interpreter shown in FIG. 1.

The control circuit comprises a keyboard K, a retrieval start switch SK, an encoder EC, an input word register X1, a capital character detector JL, a gate circuit G1, two small character converters CS1 and CS2, two capital character converters CL1 and CL2, a retrieval word register X2, an output controller OC, a retrieval circuit J, a memory unit MU, a code information detector JC, a latch circuit F, a retrieval result register Y, a gate circuit GO, a display register Z, a display decoder DC, and a display DSP. The retrieval start switch SK is actuated to initiate retrieval according to the input specific word or words as described below. The keyboard K is associated with the alphabetical keyboard 2 shown in FIG. 1. The encoder EC is provided for generating code information entered by the keyboard K. The input word register X1 connected to the encoder EC receives the code information applied by the keyboard K. The capital character detector JL is provided for detecting code information designating any capital character. The two small character converters CS1 and CS2 function to convert the capital character code information into the small character code information. The two capital character converters CL1 and CL2 act to alter the small character code information into the capital character code information. The retrieval word register X2 stores word information applied for the retrieval.

The retrieval circuit J is adapted to address the memory unit MU according to retrieval data. The memory unit MU contains a plurality of word information in connection with the "source" English words, translated Japanese words, and an appropriate number of parts of speech useful for the "source" English words.

The code information detector JC determines a sort of the word information developed from the memory unit MU whether the word information represents a capital character or a small character. The retrieval result register Y stores retrieval outputs developed from the memory unit MU. There are connected the latch circuit F and the gate circuit GO. The display register Z and the display decoder DC are provided so that the display DSP indicates desired characters.

Figures 3, 4:
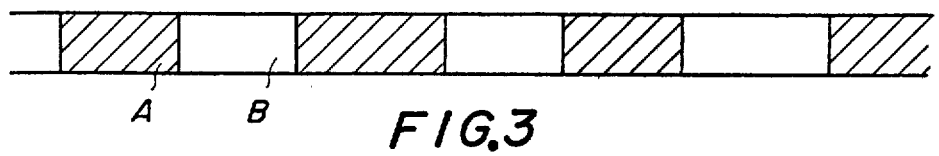
FIG. 3 shows a diagram representing storage format contained within a memory unit containing word information.

FIG. 3 shows a schematic diagram representing storage format of the word information, in particular, the "source" English words, the translated Japanese words, and the parts of speech and the like, in the memory unit MU.

In FIG. 3, an area specified as A contains code information concerning the "source" English words. The other area specified as B contains code information about the equivalent translated Japanese words, the parts of speech information, and, if necessary, other information related to the "source" English words. The two areas A and B schematically indicate elements forming the memory unit MU.

In another example of storage format, needless to say, it is not necessary that the "source" English words are stored in the same memory as the translated Japanese words, the parts of speech and the like. It is enough that the translated Japanese words, the parts of speech and the like are stored in relation to the "source" English words.

In operation, it is assumed that the size key 4 and desired alphabetical key switches both contained within the alphabetical keyboard 2 relate to the keyboard K and are subsequently actuated to produce code information representing "England". The input word register X1 receives and temporarily stores the code information for "England".

The capital character detector JL detects the presence of the first code information designating the capital character, "E", so that it operates the small character converter CS1 and the capital character converter CL1. In response to the actuation of the retrieval start switch SK, the gate circuit G1 is changed to be conductive so that the code information stored in the input word register X1 is transferred into the retrieval word register X2. At the same time, the small character converter CS1 is responsive to the capital character detector JL to convert the first code information indicating the capital character, "E", into the modified code information representing the corresponding small character, "e". Similarily, the capital character converter CL1 is also responsive to the capital character detector JL to alter the last code information indicating the last small character, "d", into the modified code information indicating the corresponding capital character, "D". The remaining code information indicative of the remaining small characters, "n", "g", "l", "a", and "n" is transferred from the input word register X1 to the retrieval word register X2 as such.

That is, the retrieval word register X2 stores the modified code information representative of "englanD". If there is absent the first code information representing a capital character as the leading character in the input buffer register X1 and there is present the first code information representing a small character as the leading character in the register X1, the contents of the input buffer register X1 are transferred into the retrieval word register X2 without any modification.

The output controller OC is provided for selecting what code information, which corresponds to each of the characters entered, is translated from the retrieval word register X2 to the retrieval circuit J. The retrieval circuit J is assumed to begin retrieval to the memory unit MU according to the first and the second code information designating the first and the second characters, say, "en", contained within the retrieval word register X2. In other words, the leading address in initiating the retrieval to the memory unit MU is one or more addresses where the first and the second characters are stored in the form of "en" in the memory unit MU.

FIG. 4(B) shows a plurality of exemplary English words stored in the form of code information in the memory unit MU. As shown in FIG. 4(B), the initial word starting with the first and the second characters in connection with "en" is "Enable". The first leading capital character "E" in the initial word "Enable" is to indicate that a plurality of English words starting with "en" are stored thereafter.

The retrieval circuit J selects subsequently addresses of the memory unit MU. The retrieval circuit J also functions to compare word information developed from the memory unit MU with the modified code information applied from the retrieval word register X2. As a result, the retrieval circuit J detects the word information equivalent to the modified code information entered by the retrieval word register X2, so that the word information is output from the memory unit MU and applied to the retrieval result register Y.

The word information to be generated from the memory unit MU as the retrieval results is applied from the retrieval circuit J to the code information detector JC through the use of a line indicated by JCS during the retrieval procedures. The code information detector JC is connected to determine whether the last code information designating the final character of the retrieval English word shows a capital character. Output signals from the code information detector JC representing the determination results detected by it are admitted to the retrieval circuit J. In this way, the retrieval circuit J will known whether a word is developed having a capital character in the final character.

If the last code information designates a capital character, the code information detector JC enables the latch circuit F thereby enabling the operation of the second capital character converter CL2 and the second small character converter CS2.

When the retrieval of an English word equivalent to the data applied from the retrieval word register X2 is completed, the retrieval word, say, "englanD" is developed from the memory unit MU and then applied to the retrieval result register Y. At the same time, the retrieval circuit J generates output signals denoted as "es" entered to the gate circuit GO.

Therefore, the gate circuit GO is turned conductive so that the retrieval word, "englanD", is transferred from the retrieval result register Y to the display register Z, in which case the second capital character converter CL2 and the second small character converter CS2 are both operated. The second capital character converter CL2 functions to alter the first code information representing the small character, "e", in the first character of the retrieval word into the modified code information designating the corresponding capital character, "E".

Concurrently, the second small character converter CS2 operates to change the final code information indicating the capital character, "D", in the final character of the retrieval word into the modified code information indicating the corresponding small character, "d". The remaining code information in connection with "n", "g", "l", "a", and "n" of the retrieval word is transmitted from the retrieval result register Y to the display register Z without any change.

As a result, the display register Z contains the modified code information representing "England". The display DSP indicates "England" with the aid of the display decoder DC.

As described above, the English words stored in the forms as indicated in FIG. 4(B) in the memory unit MU are changed to that as shown in FIG. 4(C) and then indicated in the display DSP as such.

The reason why the final character of the word contained within the memory unit MU is written in the capital character as shown in "englisH" is to indicate that the small character of the leading character in the word should be changed to the capital character for the indication in the display DSP as shown in "English". For this purpose, there may be memorized within the memory unit MU an indication representing that the small character of the leading character in the word stored in the memory unit MU should be changed to the corresponding capital character, in place of a means for memorizing the word in the form that the final character thereof is written in the capital character.

According to another example of a preferred embodiment of the present invention, the English words can be stored in the memory unit MU as shown in FIG. 4(A). In this instance, common characters over a group of words starting with "en" can be changed to a specific symbol having no relation with any alphabetical character. In particular, $1 means "ena"; $2 = "en"; $3 = "eng"; $4 = "engl"; and $5 = "engine".

In a further example of a preferred embodiment of the present invention, part of the characters common between the preceding word and the present word may be changed to a specific symbol except any alphabetical character for the purpose of simplified storage in the memory unit MU.

When the retrieval of the English "source" words is completed, word information such as the equivalent translated words, the parts of speech and other word information is also developed for the memory unit MU and then applied to the retrieval result register Y. This type of the word information is also transferred from the retrieval result register Y to the display register in accordance with the generation of the output signals es from the retrieval circuit J. In such a case, both of the second capital character converter CL2 and the second small character converter CS2 are not required to operate.

This type of the word information is as well indicated in the display DSP as similar as mentioned above.

Figure 5:
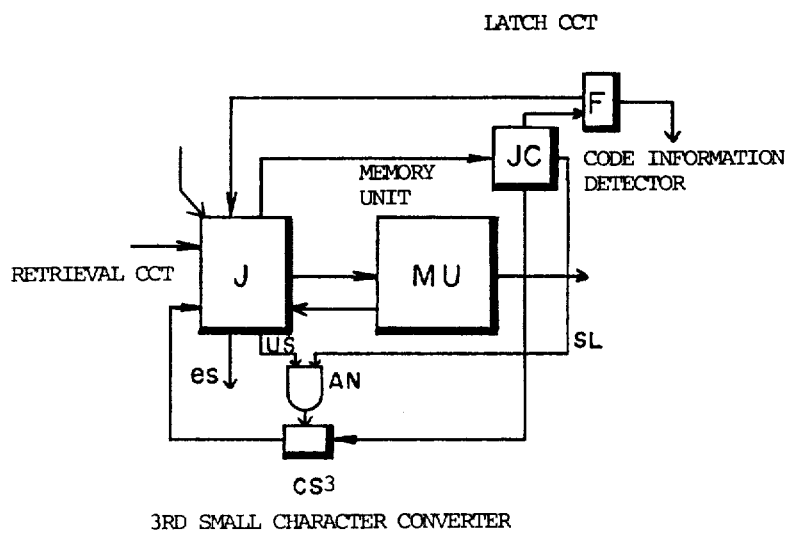
FIG. 5 is a block diagram of another preferred example of the control circuit related to that shown in FIG. 2.

FIG. 5 shows a block diagram of another preferred example of the control circuit related to that shown in FIG. 2. The retrieval circuit J, the memory unit MU, and related circuit elements are mainly shown in detail in FIG. 5. The remaining circuit elements not shown in FIG. 5 are supposed to be identical to that shown in FIG. 2, with the exception that there are absent the first small character converter CS1 and the first capital character converter CL1.

The purpose of the control circuit shown in FIG. 5 is to ensure that small-character key switches be actuated to cause retrieval of a word starting with a capital character. It is assumed that an English word "english" is entered into the input word register X1 and then into the retrieval circuit J. The retrieval circuit J causes the retrieval to the memory unit MU, so that the former J determines the coincidence up to "englis" among "englisH" stored in the memory unit MU as shown in FIG. 4(B). The last character "H", contained within the "englisH", is not coincident to the entered word "english".

An AND gate AN and the third small character converter CS3 are required to find out coincidence. The retrieval circuit J generates output signals US indicating the disagreement between "H" and "h". The retieval circuit J also provides the retrieval word, "englisH", which is not completely agreed with the entered word at this stage, applied to the code information detector JC. The code information detector JC is responsive to the retrieval circuit J to generate output signals SL indicating the presence of the code information designating a capital character in the last character of the retrieval word, "englisH". The AND gate AN receives both the output signals us from the retrieval circuit J and the output signals SL from the code information detector JC.

The AND gate AN changes to its conductive stage. The third small character converter CS3 operates in response to output signals from the AND gate AN. The third small character converter CS3 functions so that the code information representing the capital character, "H", applied from the code information detector JC is altered to the code information representing the corresponding small character, "h". The modified code information developed from the third small character converter CS3 is applied to the retrieval circuit J, wherein the retrieval circuit J has the retrieval word changed to "english". The retrieval circuit J determines the agreement of the input "source" word "english". The memory unit MU therefore develops the word information in connection with "englisH". The developed information "englisH" is changed to "English" as mentioned above.

Hence the word information, "English", is indicated in the display DSP. Other word information such as the speech, and so on is also indicated in the display DSP, successively.

Throughout the present invention, the reason why the English words are stored in the form as in principle indicated in FIG. 4(B) are to minimize capacity to be stored in the memory unit MU. Normally, the memory unit MU is composed of a read-only memory (ROM). It is desirous that the storage capacity in the ROM be minimized. If there were formed within the memory unit MU an additional group of words covering a plurality of words starting with a capital character, that would require greater capacity in the memory unit MU.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic dictionary and language interpreter device wherein a first word or words represented in a first language are entered to obtain a second word or words represented in a second language equivalent to the first word or words, comprising:
   input means for entering the first word or words in the form that the leading character is represented in a capital character and the remaining character or characters are represented in a small character;
   storage means connected to said input means for storing said first word or words therein;
   memory means for memorizing the second word or words, having a relationship with the first word or words preliminarily stored in said storage means in the form that the leading character is represented in a small character; and
   control means for permitting the memory means to generate the second word or words in accordance with the first word or words applied by the input means.

2. The device according to claim 1, wherein the storage means for preliminarily storing the first word or words in the form that the leading character is represented in a small character is contained within the memory means for memorizing the second word or words.

3. The device according to claim 1, which further comprise a display means responsive to the memory means for indicating the second word or words.

4. The device according to claim 1 or 2, wherein the control means comprises,
   first changing means for changing the first word or words entered by the input means, designated in the form that the leading character is represented in the capital character and the remaining character or characters are represented in the small character, into the first word or words designated in the form that the leading character is represented in the small character,
   access means responsive to the first changing means for causing access of the storage means according to the first word or words in the form that the leading character is represented in the small character, so that the memory means generates the second word or words in relation to the first word or words obtained from the storage means, and
   second changing means responsive to the storage means for changing the first word or words obtained from the storage means, designated in the form that the leading character is represented in the small character, into the first word or words in the form that the leading character is represented in the capital character and the remaining character or characters are represented in the small character.

5. An electronic dictionary and language interpreter device wherein a first word or words represented in a first language are entered to obtain a second word or words represented in a second language equivalent to the first word or words, comprising:
   input means for entering the first word or words in the form that the leading character is represented in a capital character and the remaining character or characters are represented in a small character;
   first changing means responsive to the input means for changing the first word or words from the form that the leading character is represented in the capital character and the remaining character or characters are represented in the small character to the different form that the leading character is represented in the small character;
   memory means for containing the second word or words and the first words or words, both of them being stored in relationship therebetween, the first word or words being stored in the form that the leading character is represented in the small character;
   access means responsive to the first changing means for causing access of the memory means so that the memory means generates the first word or words and the second word or words, the first word or words being represented in the form that the leading character is represented in the small character;
   second changing means responsive to the memory means for changing the first word or words from the form that the leading character is represented in the small character to the form that the leading character is represented in the capital character and the remaining character or characters are represented in the small character; and
   display means responsive to the second changing means for indicating the first word or words and the second word or words, the first word or words being represented in the form that the leading character is represented in the capital character and the remaining character or characters are represented in the small character.

6. The device according to claim 5, wherein the memory means comprises first memory means for containing the first word or words in the form that the leading character is represented in the small character, and second memory means for containing the second word or words.

7. The device according to claim 5 or 6, wherein the second word or words relate to a tarnslated word or words equivalent to the first word or words, a part of speech in connection with the first word or words, and other word information in connection with the first word or words.

8. The device according to claim 5, wherein the first changing means includes means for changing the last character of the first word or words from the form of the small character to the different form of the capital character under the condition that the leading character of the first word or words entered by the input means is represented in the capital character.

9. The device according to claim 8, wherein the memory means contains the first word or words in the form that the leading character is written in the small character and the last character is represented in the capital character under the condition that the first word or words are entered by the input means in such a form that the leading character is represented in the capital character and the last character is written in the small character.

10. The device according to claim 9, wherein the second changing means includes means for changing the last character of the first word or words from the form of the capital character to the different form of the small character under the condition where the leading character of the first word or words obtained from the memory means is written in the small character.

11. The device according to claim 10, which further comprises means responsive to the memory means for activating the means of the second changing means under the condition where the memory means generates the first word or words in the form that the leading character is written in the small character.

12. The device according to claim 5 or 6, wherein the memory means contains the first word or words in an abbreviated form wherein a part of characters of the first word or words is altered by a symbol different from any alphabetical character.

13. The device according to claim 12, wherein the part to be altered is the top of the characters of the first word or words.

14. An electronic dictionary and language interpreter device wherein a first word or words represented in a first language are entered to obtain a second word or words represented in a second language equivalent to the first word or words, comprising:

input means for entering the first word or words in which one or more characters contained are written in a small character;

memory means for containing the second word or words and the first words or words, both of them being stored in relationship therebetween, the first word or words being stored in the form that the leading character is represented in the small character and that there is contained an indication that the small character of the leading character should be changed to the corresponding capital character;

access means responsive to the input means for causing access of the memory means so that the memory means generates the first word or words, the indication and the second word or words, the first word or words being represented in the form that the leading character is represented in the small character;

first changing means responsive to the indication generated from the memory means for changing the first word or words which is developed from the memory means and which contains the indication that the leading character should be changed to the corresponding capital character, to the first word or words which is entered by the input means and which does not contain said indication;

comparison means responsive to the input means and the changing means for determining comparison between the first word or words entered by the input means and the first word or words obtained by the changing means;

the memory means being further responsive to the comparison means for developing the first word or words in the form that the leading character is written in the small character and that there is contained therein said indication that the small character of the leading character should be changed to the corresponding capital character;

second changing means responsive to the indication generated from the memory means for changing the first word or words developed from the memory means from the form that the leading character is written in the small character to the different form that the leading character is written in the corresponding capital character; and display means responsive to the second changing means for indicating the first word or words and the second word or words, the first word or words being represented in the form that the leading character is represented in the corresponding capital character and the remaining character or characters are represented in the small character.

15. The device according to claim 14, wherein the indication, contained within the memory means and representing that the small character written as the leading character of the first word or words stored in the memory means should be changed to the corresponding capital character, is that the end character of the first word or words stored in the memory means is written in the capital character.

16. The device according to claim 15, which further comprises third changing means responsive to the end character of the first word or words, developed from the memory means and written in the capital character, for changing the first word or words generated from the memory means in the form that the leading character is written in the small character and the end character is written in the capital character into the first word or words designated in the form that the leading character is written in the small character and the end character is written in the small character.

17. An electronic dictionary and language interpreter device for obtaining a second word or words represented in a second language in response to the entry of a first word or words represented in a first language, comprising:

input means for entering the first word or words into said language interpreter device, the leading character of the first word or words being a capital character, the remaining characters being small characters;

first changing means responsive to the entry of the first word or words for changing the leading character of the first word or words from a capital character to a small character and for storing a changed first word or words therein;

memory means for storing the second word or words therein, the second word or words having a relationship with the first word or words, the leading character of the second word or words being a small character; and control means connected to the first changing means and to the memory means for retrieving a said second word or words from said memory means in accordance with the changed first word or words stored in said changing means and for developing said first word or words and said second word or words therefrom.

18. An electronic dictionary and language interpreter device in accordance with claim 17, further comprising display means connected to said memory means for displaying said second word or words retrieved from said memory means.

19. An electronic dictionary and language interpreter device in accordance with claim 17 or 18, wherein said control means comprises access means responsive to the changed first word or words stored in said changing means for accessing said memory means to locate the said second word or words corresponding to the changed first word or words, the memory means developing the changed first word or words and the second word or words therefrom; and second changing means responsive to the changed first word or words developed from said memory means for changing the leading character of the changed first word or words from a small character to a capital character thereby reproducing said first word or words.

* * * * *